United States Patent Office.

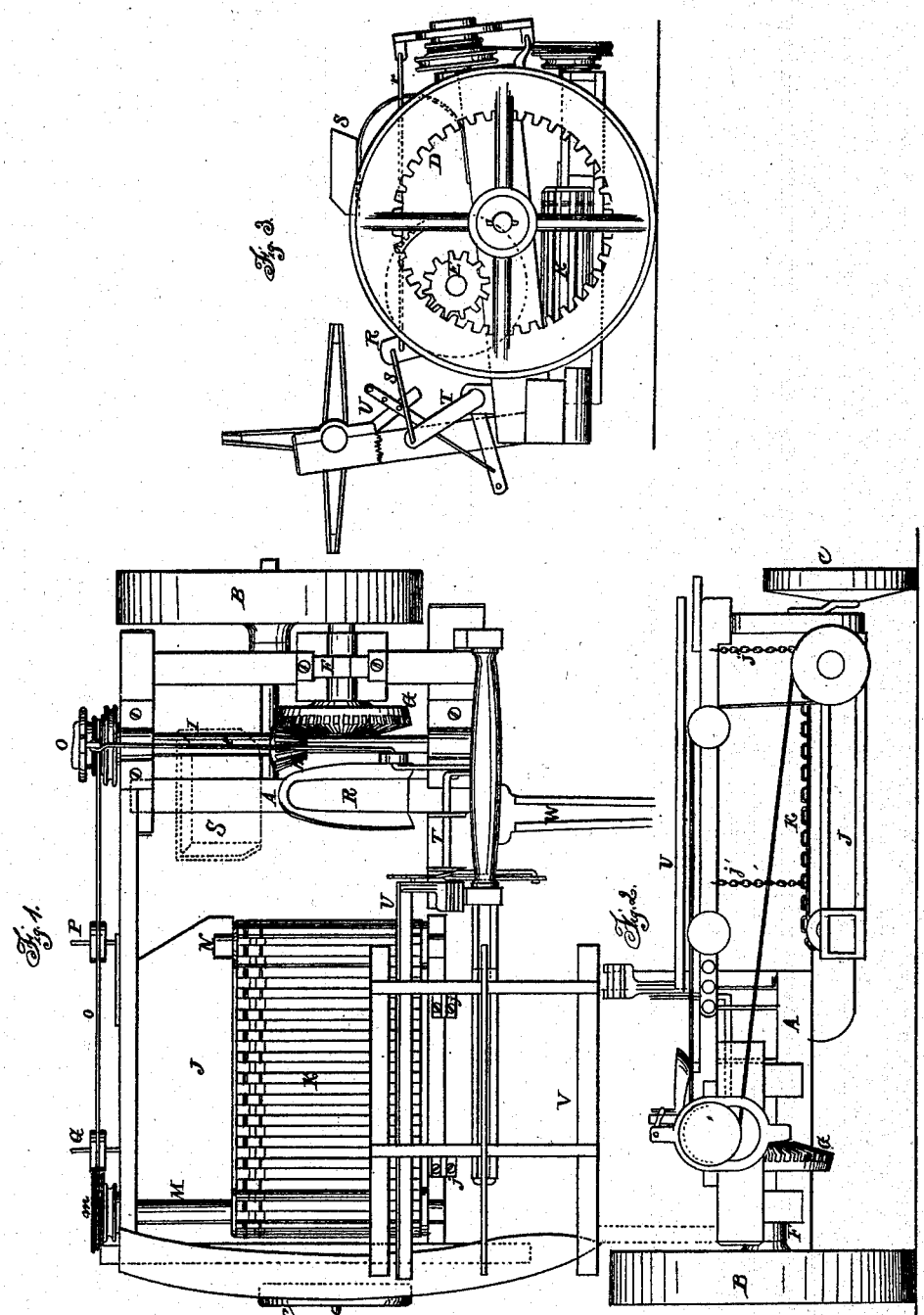

JAMES COLLINS, OF GUELPH, CANADA.

Letters Patent No. 62,252, dated February 19, 1867.

---

IMPROVEMENT IN HARVESTERS.

---

The Schedule referred to in these Letters Patent and making part of the same.

---

TO ALL WHOM IT MAY CONCERN:

Be it known that I, JAMES COLLINS, of Guelph, in the county of Wellington, and Province of Canada, have invented a new and useful Improvement in Harvesters, of which the following is a full, clear, and exact description, reference being had to the accompanying drawings, which make part of this specification, and in which—

Figure 1 is a plan or top view of a harvester embracing my improvement.

Figure 2 is a view in elevation of the same, as seen from the rear; and

Figure 3 is a similar view of the gearing side of the same.

It is the object of my invention automatically to discharge the cut grain from the platform of a harvester in gavels suitable for binding, to which end the improvement herein claimed consists in combining an intermittently moving endless apron, traversing parallel to the finger beam, and discharging the gavel inside of the driving-wheel and parallel to the path of the machine, with a cut-off which supports the falling grain while the apron is moving, and which is withdrawn when the apron stops, to permit the grain to fall upon the platform; the stoppage of the apron and the withdrawal of the cut-off being simultaneously effected by a single movement of mechanism operated by the driver.

In the accompanying drawings, which exemplify one convenient mode of carrying out the objects of my invention, a stout rectangular frame, A, is shown as supported upon two wheels, B C. The driving-wheel B carries an internally geared spur-wheel, D, which drives a spur-pinion, E, on a counter-shaft, F; this shaft carries on its inner end a bevel-wheel, G, driving a corresponding pinion, H, mounted on a crank-shaft, I, which may drive the cutters by a crank and pitman on its front end in the usual way. A suitable platform, J, is attached at its front edge to the finger-beam by suitable joints or hinges, $j$, while its rear end is suspended from the frame by chains $j'$, by which means the platform can be set at any desired angle to the ground. An endless slatted apron, K, traverses parallel to the finger-beam on rollers M N, mounted in suitable bearings on the platform. One, M, of the rollers projects beyond the rear of the frame, and carries on its rear end a set of pulleys, $m$, which are driven by a cord or band, $o$, from corresponding pulleys O on the crank-shaft. Pulleys P Q may be mounted in adjustable bearings in the frame, in order to accommodate the adjustment of the platform, and yet keep the driving cord taut. The speed of the apron may be varied by changing the band from one series of the pulleys $m$ O to the other in the usual well-known way. In order to produce an intermittent motion of the apron, I make the pulleys O slide endwise on their shaft, and thus engage them with a clutch and feather in the usual way. The pulleys are moved back and forth by a link-rod, $r$, attached to a foot-lever, R, operated by the driver from his seat S on the frame. A similar rod, $s$, operates a bell-crank lever, T, connected with the cut-off U, which is hinged to the reel standards in such manner as to allow it to vibrate around the reel but parallel to and between it and the platform. The machine has an overhung reel, V, as well as a tongue, W, and is to be provided with all the requisites of a well-organized machine, which parts it is deemed unnecessary to describe in detail here.

The following is the operation of the machine: The grain is swept back by the reel, severed by the cutting apparatus, and falls upon the endless apron which is at rest, the cut-off likewise being withdrawn. When a gavel of sufficient size has accumulated, the driver, with his foot, throws the pulleys O into gear by sliding them forward on their shaft, thus starting the apron, which discharges the grain upon the ground between the platform and driving-wheel, and parallel to the latter. The same movement which starts the apron also interposes the cut-off between the reel and platform, to receive and retain the falling grain while the apron is moving. When the gavel is discharged, the driver again throws the pulleys out of gear, the apron ceases to move, the cut-off is withdrawn, and the grain falls upon the apron, as before, until another gavel has accumulated, when the above-described process is repeated. My improvement has proved itself to be one of great value by practical success in the harvest-field.

What I claim as my invention, and desire to secure by Letters Patent, is—

1. The combination of the intermittently moving endless apron (moving parallel to the finger-beam to effect a side delivery) with the vibrating cut-off.

2. The combination, substantially as described, of the cut-off and intermittently moving endless apron with the driving mechanism and shipping lever, for the purpose of enabling the driver simultaneously to stop the apron and withdraw the cut-off, or to start the apron and interpose the cut-off, as set forth.

3. The combination of the suspended endless apron with the tension-pulleys, driving-bands, driving-pulleys, and shifting-gear, as described.

In testimony whereof I have hereunto subscribed my name.

JAMES COLLINS.

Witnesses:
P. RYAN,
JOHN CONWAY.